United States Patent [19]

Ledru

[11] 4,321,154

[45] Mar. 23, 1982

[54] HIGH TEMPERATURE THERMAL INSULATION MATERIAL AND METHOD FOR MAKING SAME

[75] Inventor: Francois Ledru, Germignan le Taillan Medoc, France

[73] Assignee: Societe Europeene de Propulsion, Puteaux, France

[21] Appl. No.: 168,171

[22] Filed: Jul. 14, 1980

[30] Foreign Application Priority Data

Jul. 19, 1979 [FR] France ................................ 79 18734

[51] Int. Cl.³ ............................................ C04B 43/00
[52] U.S. Cl. .................................... 252/62; 264/29.2; 264/29.1; 428/902; 428/312.2; 501/82; 501/95
[58] Field of Search ........................... 252/62; 106/41; 428/902; 264/29.2, 29.1

[56] References Cited

FOREIGN PATENT DOCUMENTS 2029638 10/1970 France .
2275893 1/1976 France .
2380236 9/1978 France .

OTHER PUBLICATIONS

Chemical Abstracts, vol. 87, 1977-188353r, p. 236 Columbus, Ohio (U.S.).
Yutina et al., "Heat-Insulation Paper and Cardboard from Refractory Fiber" *Ogneupory,* vol. 18, No. 8, pp. 6-9, Aug. 1977.

*Primary Examiner*—Mayer Weinblatt
*Attorney, Agent, or Firm*—Weingarten, Schurgin & Gagnebin

[57] ABSTRACT

A thermal insulation material at high temperature comprising insulating mineral fibres bonded in a matrix, wherein the mineral fibres have a melting point higher than 1.000° C. and represent 15 to 60% of the weight of the material, and wherein the matrix is formed, at least in part, by pyrolytic carbon which represents 18 to 40% of the weight of the material. A method for making such a material comprises dispersing a carbon-containing material such as a resin made of fibrous reinforcement, shaping by moulding the mixture thus obtained and pyrolysis of the carbon-containing material.

15 Claims, No Drawings

HIGH TEMPERATURE THERMAL INSULATION MATERIAL AND METHOD FOR MAKING SAME

The present invention relates to a material which is a heat insulator at high temperature, of the type comprising insulating mineral fibres caught in a matrix.

The fields of application aimed at in the present invention are those where the product required should have a very low heat conductivity as well as an excellent resistance and dimensional stability at high temperature, namely at temperatures higher than 1000° C. By way of indication, these fields cover for example, firetrap partitions for flame temperatures exceeding 1000° C. used in aeronautics, the navy, the motorcar industry, etc... as well as the heat insulation of thermal treatment furnaces used in the metallurgy, the siderurgy, the ceramics industry, in domestic appliances, or as casting channels for molten 3 metals, etc.

It is the object of the present invention to propose an insulating material having all the aforesaid properties with, in addition, the possibility of adapting its mechanical properties and the possibility of being shaped and machined depending on the proposed applications.

This object is attained by an insulating material of the type defined at the beginning of the description and, wherein, according to the invention, the mineral fibres have a melting point higher than 1000° C. and represent 15 to 60% of the weight of the material, and the matrix is formed at least partly, by pyrolytic carbon which represents 18 to 40% of the weight of the material.

Such a material may have a thermal conductivity less than 0.4 w/m.° K., a compressive strength higher than 160 kg/cm$^2$ and a density comprised between 0.4 and 1.6 g/cm$^3$.

The fibres represent approximately 15 to 60% by weight of the material.

The fibres are preferably selected in the group constituted by highly pure silica fibres, alumina fibres and ceramic fibres.

According to a preferred embodiment of the invention, the mineral fibres used are alumina fibres containing at least 90% Al$_2$O$_3$ or silico-aluminous ceramic fibres containing about 40 to 60% Al$_2$O$_3$ and between 40 and 60% of SiO$_2$.

The diameter of the fibres is selected to be small enough, i.e. less than about 15 microns, to avoid the fibres being brittle. Said diameter is also generally greater than about 1 micron because of the conditions in which the fibres are obtained.

The length of the fibres is selected to be greater than about 3 mm so that said fibres can act as mechanical reinforcement inside the insulating material. There is no critical maximum value for the length of the fibres other than that dictated by the method used to produce said fibres. It is nonetheless an accepted fact that the use of fibres longer than 300 mm does not bring any significant improvement in the mechanical strength of the composite material.

The invention further relates to a method for producing the insulating material, which method comprises the steps of:

dispersion of a carbon-containing material inside a fibrous reinforcement made of mineral fibres whose melting point is above 1000° C., the weight percentage of the fibres in the carbon-containing material/fibres combination being comprised between 25% and 65%, shaping by moulding of the carbon-containing material/fibres combination, and pyrolysis of the carbon-containing material.

The Wt % of fibres in the carbon-containing material/fibres combination is selected to be greater than about 25% in order to give an adequate mechanical strength to the final material via the fibrous reinforcement. This Wt % is less than 65% in order to avoid the difficulties of penetration of the carbon-containing material inside the fibrous reinforcement.

The distribution of the fibres is immaterial: it can be either random, the fibres being loosely distributed, or not, the fibres being in sheet form or woven in layers, or in any other remarkable form.

The carbon-containing material used is preferably a synthetic resin, such as a thermo-setting phenol-formaldehyde resin having a polymerization temperature varying between 150° and 200° C. or being polymerizable at room temperature by addition of a catalyst system in the proportion of 5 to 15% by weight. In this last case, preference will be given to a catalyst system which does not deteriorate at the pyrolysis temperature so as to confer to the final product a better resistance to oxidation.

Other thermo-setting resins can also be used, such as for example cresylic resins or aminated resins of the formaldehyde urea type or formaldehyde-melamine type.

Finally, other carbon-containing materials besides the thermo-setting resins can be used, such as for example coal tars or oil tars.

In order to obtain a lightweight insulation material as final product, it is possible to incorporate to the carbon-containing material, before the pyrolysis, elements which permit a density reduction. For example, a liquid expanding agent (such as freon or heptane) can be incorporated to liquid resin, used as carbon-containing material, in the proportion of 5 to 20% by weight, said incorporation being effected before the fibres are impregnated with the resin so as to allow the subsequent expansion thereof between the fibres throughout the whole product to be pyrolyzed. Another density-reducing method consists in dispersing homogeneously into the carbon-containing material some hollow particles forming micro-spheres or micro-balls, in silica or carbon for example, the said particles having a diameter that may vary between 30 and 300 microns and being added in a proportion which, by weight, corresponds to between 5 and 30% of the carbon-containing material before this is dispersed into the fibrous reinforcement.

Whether or not the carbon-containing material contains an expanding agent or hollow micro-spheres, said material is dispersed into the fibrous reinforcement formed by fibres deposited either loosely, or in woven sheets or layers.

The dispersion of the carbon-containing material to form a fibrous reinforcement can be effected before the shaping of the product to be pyrolyzed. When the carbon-containing material is pulverulent, for example when it is constituted by a solid resin, the dispersion is achieved by mixing the fibres with the carbon-containing material. When the latter is liquid, for example in the case of a resin diluted in a solvent or in aqueous solution, the fibres are impregnated by immersion into a diluted resin bath, the volatiles being evaporated after draining.

It is also possible to spread the carbon-containing material over the fibrous reinforcement, the resin then penetrating between the fibres when the product to be pyrolyzed is shaped.

Said shaping is produced with a view to obtain a preform which, after pyrolysis, will be a blank of the final insulating material which will be obtained. For the shaping, molding under a pressure higher than the atmospheric pressure is used. Conventional molding methods may be used such as molding by compression or by transfer-compression (a preheating followed by a compression), or by centrifuging, or else "bag-molding" (the product being enclosed in a bag) in hydroclave or autoclave.

When the carbon-containing material is a polymerizable resin, part at least of the polymerization of the resin at high temperature or at room temperature with a catalyst takes place at the molding stage. The molding conditions are therefore dependent on the type of the resin and on the polymerization. Said conditions are also dependent on the configuration of the product to be molded (whether or not this is a lightweight product).

The preform is pyrolyzed at a temperature at least equal to 600° C., in an inert atmosphere. The temperature rising and reducing times are not critical. A level of about 15 minutes at the pyrolyzing temperature should be respected after the temperature has become even, throughout the product.

Considering the quantities of fibres used at the start, the final material can contain between 15 and 60% by weight of fibres and between 18 and 40% by weight of pyrolytic carbon, any rest being constituted by the carbon-free elements of the matrix. It will be noted that the product obtained is porous.

After pyrolysis, said porous material may be eventually densified by introduction of a refractory product into its porosity, in order in particular to increase the resistance to compression. The densification may be performed by impregnation-pyrolysis, i.e. re-addition of carbon-containing materials such as tars and resins and carrying out of a further pyrolysis. The densification may also be performed by a known chemical vapor deposition process for depositing for example carbon or silicon carbide as disclosed in particular by the French Patent Applications Nos. 2,189,207 and 2,401,888.

The material according to the invention is found to have series of characteristics which make it particularly efficient.

The density for example can vary between 0.4 and 1.6 g/cm$^3$ depending on whether or not the product is lightweight.

The compressive strength can be higher than 160 kg/cm$^2$ and reach 450 kg/cm$^2$ at a temperature up to 1400° C.

The heat conductivity can reach very low values, even below 0.4 W/m° K. as indicated hereinabove.

The dimensional stability is very high even at a high temperature. The coefficient of expansion is about $16.10^{-6}$, and the shrinkage is virtually nil after exposure to 1100° C.

The resistance to high temperature is excellent in inert atmosphere, the material retaining all its integrity up to a continuous exposure at a temperature of about 1600° C. Similar performances can be reached in an oxidising medium provided there is an oxygen-proof surface protection.

The resistance to thermal shocks is excellent, and the material can withstand, for relatively short periods, temperatures going up to 3000° C., without being destroyed.

Finally the structural integrity of the product is adequate enough to allow the material to be worked into complex shapes and to withstand forces resulting from shocks, vibrations and accelerations.

Certain properties of the material can be improved by adding reinforcement and/or protection elements.

For example, the mechanical properties of the material can be improved by way of a single- or bi-directional reinforcement of the same nature as that of the basic fibrous reinforcement or of a different nature. Said reinforcements can be incorporated to the material when this is produced or can be added superficially after production. By way of example, silica, or glass- or carbon-cloth can be used and incorporated at production time so as to be caught in the matrix. Metallic reinforcements (such as stainless steel, aluminium, titanium, etc.) can also be used in sheet form (foils) or deposited by spraying, or by electrolysis or in vacuum.

Moreover, a coating may be added to the surface of the material for different purposes: reinforcement of the material from a mechanical standpoint, protection of the surface against chemical or abrasive products for example, confinement of the material in an airtight chamber to improve its resistance to oxidation at high temperature.

Superficial protections can be added during or after production. For such protections, single- or bi-directional materials can be used such as carbon-, silica- or glass-cloths, or metallic materials (stainless steel, aluminium, titanium, etc.) in sheet form or deposited by spraying, electrolysis or in vacuum.

Two examples of embodiment of an insulating material according to the invention are given hereunder.

EXAMPLE 1

A preform is prepared from ceramic fibres of diameter varying between 2 and 5 microns and of length varying between 150 and 250 mm and from a resol type phenolic resin.

After impregnation of the fibres, the resin is polycondensed at a temperature of 160° C. under a pressure of 10 bars for two hours.

The preform had the following characteristics:
fibre content: 65%
density: 1.37 g/cm$^3$ The preform is pyrolysed in a nitrogen atmosphere at a maximum temperature of 900° C. with a temperature rising gradient of 7° C./minute.

The characteristics of the material obtained are as follows:
density: 1.2 g/cm$^3$
porosity: 45%
heat conductivity: 0.3 W/m° K.
heat diffusity: $0.28.10^{-8}$ m2/sec
bending strength: 160 kg/m2
bending modulus: $39,10^3$ kg/cm2
compressive strength: 160 kg/cm2
shrinkage at 1100°: nil A test piece of the material obtained according to this example, of 20 mm thickness, is subjected on its front face, in inert atmosphere, to a thermal flux of 110 calories/cm2 s. No smoke is released and the temperature of the rear face is below 500° C. after two minutes.

EXAMPLE 2

A preform prepared according to Example 1 is densified by re-addition of tar followed by a second pyrolysis in a nitrogen atmosphere at a temperature of 900° C.

The characteristics of the material obtained are as follows:
- density: 1.45 g/cm$^3$
- porosity: $\propto$ 20%
- heat conductivity: 0.4 W/m.° K.
- bending strength: 250 kg/cm$^2$ at 20° C.; 350 kg/cm$^2$ at 1000° C.; 200 kg/cm$^2$ at 1400° C.;
- compressive strength: 450 kg/cm$^2$ up to 1400° C.

EXAMPLE 3

A test piece of 2 mm thickness prepared according to Example 1, but pyrolyzed at 600° C., is coated on its two faces with a 1/10th mm layer of stainless steel, using the spraying method.

After a fire reaction test at 1100° C. and 30 minutes, the test-piece is neither holed nor deformed and its matrix has retained all its integrity. During the test, the temperature of the face opposed to the flame does not exceed 400° C. Moreover, there is no release of any smoke that could keep a flame going.

Various modifications and additions may be brought to the embodiments described hereinabove of an insulating material according to the invention and of its preparation method without for all that departing from the scope of protection defined in the accompanying claims.

What is claimed is:

1. A thermal insulation material of a density of at least 0.4 g/cm$^2$ and a compressive strength of at least 160 kg/cm$^2$ comprising fibres selected from the group consisting of highly pure silica fibers, alumina fibers and ceramic fibers and having a melting point higher than 1000° C. bonded in a matrix comprising pyrolytic carbon produced from a synthetic resin, said pyrolytic carbon comprising 18% to 40% by weight of said thermal insulating material.

2. A material as claimed in claim 1, and having a thermal conductivity less than 0.4 W/m.° K.

3. A material as claimed in claim 1, and having a density comprised between 0.4 and 1.6 g/cm$^3$.

4. A material as claimed in claim 1, wherein the fibres are alumina fibres containing at least 90% Al$_2$O$_3$.

5. A material as claimed in claim 1, wherein the fibres are silico-aluminous fibres containing between about 40 and 60% Al$_2$O$_3$ and between about 40 and 60% SiO$_2$.

6. A material as claimed in claim 1 further comprising a metallic reinforcement in addition to said mineral fibres.

7. A material as claimed in claim 1 wherein the density of said thermal insulating material is equal to at least 1.6 g/cm$^2$.

8. A material as claimed in claim 1 wherein said pyrolytic carbon is produced by the pyrolysis of an expanded thermo-setting synthetic resin.

9. A material as claimed in claim 1 wherein said matrix further comprises hollow particles.

10. A material as claimed in claim 1 further comprising a fibrous reinforcing material.

11. A material as claimed in claim 1 further comprising a coating formed of a fibrous material.

12. A material as claimed in claim 1 further comprising a coating formed of a metallic material.

13. A material as claimed in claim 1 further comprising a refractory product for densification thereof.

14. A material as claimed in claim 13 wherein said refractory product comprises carbon.

15. A material as claimed in claim 13 wherein said refractory product comprises silicon carbide.

* * * * *